US010990579B2

(12) United States Patent
Ramachandra Iyer et al.

(10) Patent No.: US 10,990,579 B2
(45) Date of Patent: Apr. 27, 2021

(54) METHOD AND SYSTEM FOR PROVIDING RESPONSE TO USER INPUT

(71) Applicant: WIPRO LIMITED, Bangalore (IN)

(72) Inventors: Manjunath Ramachandra Iyer, Bangalore (IN); Suyog Trivedi, Indore (IN); Gopichand Agnihotram, Bangalore (IN)

(73) Assignee: Wipro Limited, Bangalore (IN)

( * ) Notice: Subject to any disclaimer, the term of this patent is extended or adjusted under 35 U.S.C. 154(b) by 347 days.

(21) Appl. No.: 15/873,925

(22) Filed: Jan. 18, 2018

(65) Prior Publication Data
US 2019/0163749 A1    May 30, 2019

(30) Foreign Application Priority Data
Nov. 30, 2017   (IN) .............................. 201741043002

(51) Int. Cl.
| G06F 16/23 | (2019.01) |
| G06F 16/48 | (2019.01) |
| G06F 16/242 | (2019.01) |
| G06F 16/903 | (2019.01) |
| G06F 16/901 | (2019.01) |

(52) U.S. Cl.
CPC .......... *G06F 16/23* (2019.01); *G06F 16/2423* (2019.01); *G06F 16/48* (2019.01); *G06F 16/9024* (2019.01); *G06F 16/90335* (2019.01)

(58) Field of Classification Search
CPC .......... G06F 16/9024; G06F 16/24578; G06F 16/248; G06F 16/951; G06F 16/24526; G06F 16/334; G06F 16/9038; G06F 16/242

USPC ................................. 707/610, 722, 723, 769
See application file for complete search history.

(56) References Cited

U.S. PATENT DOCUMENTS

| 10,445,328 B2* | 10/2019 | Zhou ................. G06F 16/24526 |
| 10,453,117 B1* | 10/2019 | Reavely ................. G06F 40/295 |
| 2011/0191290 A1* | 8/2011 | Gutlapalli ............... G06F 16/00 707/610 |
| 2014/0046934 A1* | 2/2014 | Zhou ..................... G06F 16/951 707/723 |

(Continued)

OTHER PUBLICATIONS

K. Marino, et al., "The More You Know: Using Knowledge Graphs for Image Classification", arXiv:1612.04844v2 [cs.CV], Apr. 22, 2017, pp. 1-9.

*Primary Examiner* — Dangelino N Gortayo
(74) *Attorney, Agent, or Firm* — Finnegan, Henderson, Farabow, Garrett & Dunner, LLP (57) ABSTRACT

The present disclosure discloses a method and system for providing response to a user input. The system receives a user input, processes the user input by finding equivalents of the user input and dividing each of the user input and the equivalents into a frame. One or more keywords are generated for each of the one or more frames. Further, each of the one or more frames are classified into one or more domains present in a knowledge graph. Then, one or more objects are determined in each of the corresponding one or more domains based on the corresponding one or more keywords. Further, a processing means is determined for each of the one or more objects based on the metadata of the corresponding one or more objects. The processing means is processed by the system for providing response to the user input.

21 Claims, 7 Drawing Sheets

(56) References Cited

U.S. PATENT DOCUMENTS

| | | | |
|---|---|---|---|
| 2016/0063106 A1* | 3/2016 | Chai | G06F 16/951 |
| | | | 707/722 |
| 2016/0373456 A1* | 12/2016 | Vermeulen | G06F 16/3329 |
| 2017/0024375 A1 | 1/2017 | Hakkani-Tur et al. | |
| 2017/0076206 A1 | 3/2017 | Lastras-Montano et al. | |
| 2017/0293690 A1* | 10/2017 | Malhotra | G06F 16/9535 |
| 2018/0052884 A1* | 2/2018 | Kale | G06F 16/242 |
| 2019/0018904 A1* | 1/2019 | Russell | G06F 16/24578 |

* cited by examiner

METHOD AND SYSTEM FOR PROVIDING RESPONSE TO USER INPUT

TECHNICAL FIELD

The present disclosure relates to a data processing system. More particularly, but not exclusively, the present disclosure relates to a data processing system for providing response to user input based on real time data.

BACKGROUND

A data processing system is a combination of processes that receives a set of inputs and produces a defined set of output. The input may be provided by a user. User input may be in the form of a query. The data processing system processes the input, searches and retrieves the required data from databases, networks, Internet etc. associated with the data processing unit, to provide a response to the user input.

A tremendous increase is observed in the amount of information and its varied presence across multiple sources over networks, databases, Internet etc. Thus, it is difficult to readily obtain a correct response to a user query or input in existing systems. For a number of user queries, information is generally not available in readily usable form especially when the user queries are generic. For example, considering a scenario where a user wants to know number of people standing in front of a place at a particular time. A database does not exist from which the data processing system can retrieve the information as required by the user. The existing data processing systems provide response to the user input on the basis of the past data stored in a database and may not be able to fetch real time data. Thus, the existing data processing systems expect the response to be readily present in the database. The existing data processing systems are incapable of providing an intelligently analysed response to the user input or query in absence of readily available information from a database or a webpage.

The information disclosed in this background of the disclosure section is only for enhancement of understanding of the general background of the invention and should not be taken as an acknowledgement or any form of suggestion that this information forms the prior art already known to a person skilled in the art.

SUMMARY

In an embodiment, the present disclosure discloses a method for providing response to user input. The method comprises receiving, by a data processing system, user input, generating, one or more equivalents of the user input. The user input and each of the one or more equivalents of the user input are stored in corresponding one or more frames. The method further comprises, generating one or more keywords for each of the corresponding one or more frames, classifying, each of the corresponding one or more frames into one or more domains based on a first set of parameters. The one or more domains are present in a knowledge graph. The method further comprises, determining, one or more objects in each of the one or more domains based on the one or more keywords, determining, one or more object links between each of the one or more objects and the one or more keywords. Each of the one or more object links is associated with a corresponding object link confidence value. The method further comprises identifying, at least one optimum object link from the one or more object links, and corresponding one or more objects, based on the corresponding object link confidence value, and generating, a response to the user input, based on the corresponding one or more objects.

In an embodiment, the present disclosure discloses a data processing system for providing response to user input. The data processing system comprises a processor and a memory, communicatively coupled with the processor, storing processor executable instructions, which, on execution causes the processor to receive a user input, generate, one or more equivalents of the user input. The user input and each of the one or more equivalents of the user input are stored in corresponding one or more frames. The processor further generates, one or more keywords for each of the corresponding one or more frames, classifies, each of the corresponding one or more frames into one or more domains based on a first set of parameters. The one or more domains are present in a knowledge graph. The processor further determines, one or more objects in each of the one or more domains based on the one or more keywords, determines, one or more object links between each of the one or more objects and the one or more keywords. Each of the one or more object links is associated with a corresponding object link confidence value. The processor further identifies, at least one optimum object link from the one or more object links, and corresponding one or more objects, based on the corresponding object link confidence value and generates, a response to the user input, based on the corresponding one or more objects.

In an embodiment, the present disclosure discloses a non-transitory computer readable medium including instruction stored thereon that when processed by at least one processor cause a data processing system to receive user input. The instructions may cause the processor to generate one or more equivalents of the user input. The user input and each of the one or more equivalents of the user input are stored in corresponding one or more frames. The instructions may cause the processor to generate one or more keywords for each of the corresponding one or more frames. The instructions may cause the processor to classify each of the corresponding one or more frames into one or more domains based on a first set of parameters. The one or more domains are present in a knowledge graph. The instructions may cause the processor to determine one or more objects in each of the one or more domains based on the one or more keywords. The instructions may cause the processor to determine one or more object links between each of the one or more objects and the one or more keywords. Each of the one or more object links is associated with a corresponding object link confidence value. The instructions may cause the processor to identify at least one optimum object link from the one or more object links, and corresponding one or more objects, based on the corresponding object link confidence value and the instructions may cause the processor to generate a response to the user input, based on the corresponding one or more objects.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristic of the disclosure are set forth in the appended claims. The disclosure itself, however, as well as a preferred mode of use, further objectives and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to a method and system for providing a response to user input. The system may receive a user input requiring a response from the system. The system generates one or more equivalents of the user query to understand requirements of a user providing the user query. Further, the system generates one or more keywords from the one or more equivalents and the user query. The keywords may be used for identifying one or more domains from a knowledge graph. The one or more domains may comprise one or more one or more objects and corresponding one or more services. The one or more objects and the corresponding one or more services may be used for generating a response to the user query. The system and method of the present disclosure fetches real time data and provides a user desired response.

Figure 1:
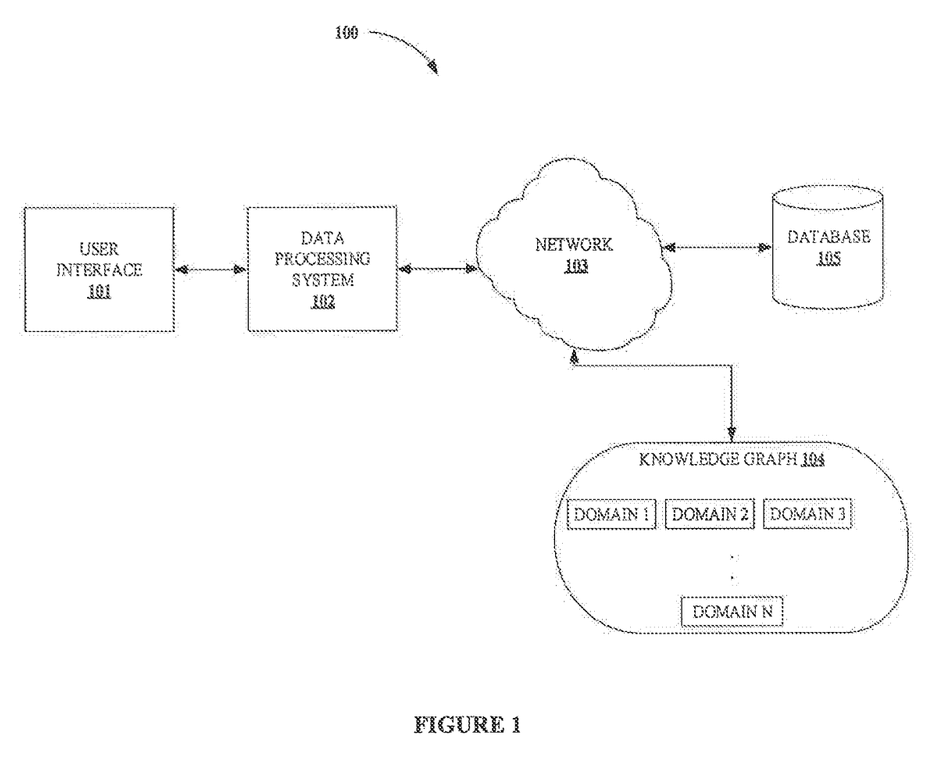
FIG. 1 shows a block diagram illustrative of an environment for providing a response to user input, in accordance with some embodiments of the present disclosure.

FIG. 1 shows an environment 100 for providing a response to user input. The environment 100 comprises a user interface 101, a data processing system 102, a database 105, a knowledge graph 104, and a network 103 which is connected to the data processing system 102, the database 105 and the knowledge graph 104. The user interface 101 may be capable of receiving the user input. The user input may be, but not limited to, a user query, generic statements, conversations of the user with the system or other humans, and the like. The data processing system 102 processes the user input and provides a response to the user input. The network 103 communicatively connects the data processing system 102 to the database 105 and the knowledge graph 104. The data processing system 102 may retrieve data from the database 105 and the knowledge graph 104 for generating the response. Also, the data processing system 102 may update the database 105 with the user input and the corresponding response. The updated database may be used to generate a new response for subsequent user input. In an embodiment, the data processing system 102 retrieves the data from the database 105 and the knowledge graph 104 and further processes the data to provide a response to the user input. The data processing system 102 retrieves data from the database 105 and the knowledge graph 104 based on the user input received. In an embodiment, the data processing system 102 may also update the database 105 and the knowledge graph 104 based on the response provided to the user input.

In an implementation, the data processing system 102 may be configured in one or more user devices (not shown) used by one or more users. In an embodiment, the one or more users may be a person or a computing system. The one or more user devices may include, but are not limited to, computing systems, such as a laptop, a computer, a desktop computer, a Personal Computer (PC), a notebook, a smartphone, a smart watch, a wearable device, a tablet, e-book readers. A person skilled in the art would understand that the data processing system 102 may be configured on any other device, not mentioned explicitly in the present disclosure.

In an embodiment, the user interface 101 may be a medium through which user input is received from the one or more users. In an embodiment, the user interface 101 may be a part of the data processing system 102 or as a separate unit. In an implementation where, the user interface 101 is a separate unit, it may be connected to the data processing system 102 via a wired or a wireless means. The user interface may include, but is not limited to, a keyboard, keypad, a touchpad, a mike, a camera, a mouse, a microphone, a touchscreen, a joystick, a stylus, a scanner and any other medium which is capable of receiving the input from the one or more users.

In an embodiment, the data processing system 102 may communicate with the database 105 and the knowledge graph 104 through the network 103. The data processing system 102 may be disposed in communication with the network 103 via a network interface (not shown). The network interface may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The network 103 may include, without limitation, a direct interconnection, wired connection, e-commerce network, a peer to peer (P2P) network, Local Area Network (LAN), Wide Area Network (WAN), wireless network (e.g., using Wireless Application Protocol (WAP)), the Internet, Wireless Fidelity (Wi-Fi), etc.

In an embodiment the knowledge graph 104 may comprise a domain 1, domain 2, domain 3, . . . , domain N. The domain 1, domain 2, domain 3, . . . , domain N can be collectively represented as a set of domains hereafter in the present disclosure. The knowledge graph 104 is a knowledge base used to enhance ability of the data processing system 102 to retrieve relevant information and provide an appropriate response to the user input. Using the knowledge graph 104, desired response may be achieved, thus providing accurate results to the user input. The knowledge graph 104, may comprise data about the one or more keywords extracted from the user input, historical data of user input and the intent behind the user input, based on the data existing in database. With the knowledge graph 104, the one or more users may get information about people, facts and places that are interconnected. The knowledge graph 104 may comprise, but is not limited to, the set of domains like ontology, politics, tourism, healthcare, sports, etc. For instance, "Taj Mahal" is associated with "Agra" as a tourist place in Agra. "Taj Mahal" may also be associated with Shah Jahan as an architect. Likewise, Agra could be associated with India as a city, etc.

In an embodiment, the database 105 may comprise metadata associated with each of one or more objects. The one or more objects are determined in each of the one or more domains based on the one or more keywords. Consider an instance where a keyword is "Taj Mahal", an object associated with the keyword "Taj Mahal" may be "Agra". The object "Agra" is a location or a place. Similarly, another object namely "Shan Jahan" may be associated with the keyword "Taj Mahal". The object "Shan Jahan" is a person. Hence, the one or more objects may be defined as a device, a service provider, a person, a place or a location and any other information linked to the one or more keywords and which are relevant to the user input. Metadata is the information associated with each of the one or more objects. For an instance if camera is the object, then the metadata may comprise information regarding attributes of the camera like make of the camera, resolution, exposure, storage space, type of output generated, multiple vendors who provide camera services, Universal Resource Locator (URL) of Application Programming Interface (API) the camera uses and description of the URL. For instance, there may be an API which receives an image as an input and provides face count i.e., number of people in the image as an output.

Figure 2:
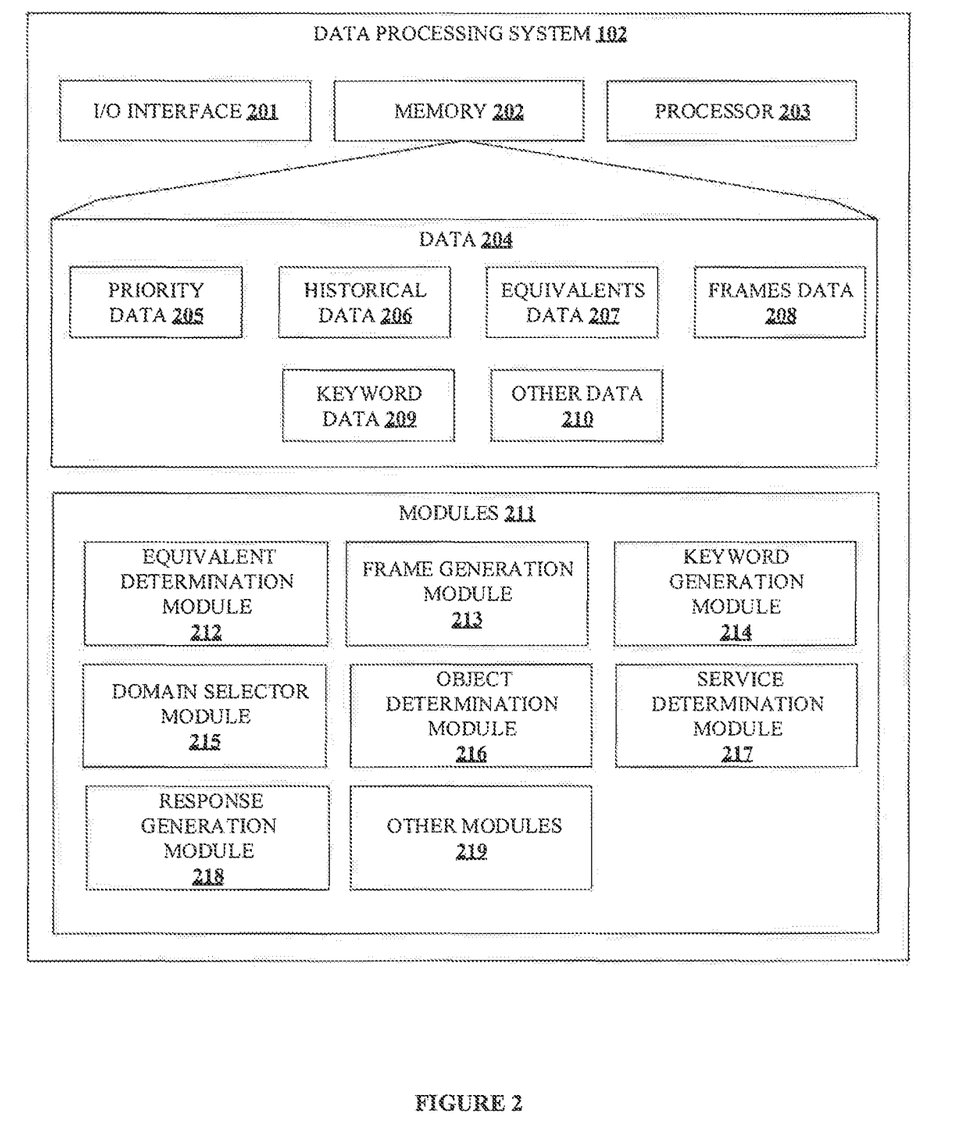
FIG. 2 shows an exemplary block diagram of a data processing system for providing a response to user input, in accordance with some embodiments of the present disclosure.

FIG. 2 shows an exemplary block diagram of a data processing system 102 for providing response to user input in accordance with some embodiments of the present disclosure. The data processing system 102 may include at least one processor 203 and a memory 202 storing instructions executable by the at least one processor 203. The processor 203 may comprise at least one data processor for executing program components for executing user or system-generated requests. The memory 202 is communicatively coupled to the processor 203. The data processing system 102 further comprises an Input/Output (I/O) interface 201. The I/O interface 201 is coupled with the processor 203 through which an input signal or/and an output signal is communicated. In an embodiment, the I/O interface 201 couples the user interface 101 to the data processing system 102.

In an embodiment, data 204 may be stored within the memory 202. The data 204 may include, for example, priority data 205, historical data 206, equivalents data 207, frames data 208, keyword data 209 and other data 210.

In an embodiment, the priority data 205 may comprise a list of the set of domains present in the knowledge graph 104 and a corresponding priority assigned to each domain of the set of domains. For instance, if the user input is Taj Mahal, the priority for tourism domain may be higher when compared to monuments domain. The priorities may be assigned based on at least one of the historical data 206, search terms previously used, data traffic associated with each of the one or more domains, frequency of usage of previous user inputs, and trending items.

In an embodiment, the historical data 206, may comprise previous user inputs, results and/or responses provided to the previous user input, the keywords used in the previous user inputs, previous mappings used for a particular keyword used in the past, etc.

In an embodiment, the equivalents data 207, may refer to the one or more equivalents generated for the user input. The one or more equivalents generated for each user input may be stored as the equivalents data 207. For instance, consider the user input to be "How many people are standing in front of Taj Mahal now?". One of the equivalents, may be "number of people standing in front of Taj Mahal now". Another equivalent may be "people count in front of Taj Mahal".

In an embodiment, the frames data 208, may refer to corresponding one or more frames which stores the user input and the one or more equivalents.

In an embodiment, the keyword data 209, may refer to the one or more keywords generated for each of the corresponding one or more frames which stores the user input and the one or more equivalents.

In an embodiment the other data 210 may include, but is not limited to, a template data. The template data stores standard templates of the frames. Standard templates of the frames store the one or more slots and the corresponding header for each slot of the one or more slots present in each of the one or more frames. The frames may be generated according to the user input. In an embodiment, the user input and the one or more equivalents may be stored in the standard templates.

In an embodiment, the data 204 in the memory 202 is processed by modules 211 of the data processing system 102. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The modules 211 when configured with the functionality defined in the present disclosure will result in a novel hardware.

In one implementation, the modules 211 may include, for example, an equivalent determination module 212, a frame generation module 213, a keyword generation module 214, a domain selector module 215, an object determination module 216, a service determination module 217, a response generation module 218 and other modules 219. It will be appreciated that such aforementioned modules 211 may be represented as a single module or a combination of different modules.

In an embodiment, the equivalent determination module 212 may receive the user input from the I/O interface 201. The equivalent determination module 212 may generate one or more equivalents of the user input. In an embodiment, the words, alphabets, numbers, symbols, or any character in the user input may not be clear for the data processing system 102 for generating an accurate response to the user input. In another embodiment, the one or more equivalents of the user input are generated to determine one or more meaningful sentences. Consider an example phrase "Robin, a hunter was skilled with a bow". Here, the word bow may refer to either a weapon or a part of a musical instrument. Hence, the one or more equivalents of the phrase may be used to determine the user desired phrase. For example, an equivalent of the above-mentioned phrase may be "Robin used bow for hunting" which may indicate that term bow relates to a weapon. Hence, one or more equivalents of the user input may be generated to obtain alternate keywords for the user input. The alternate keywords may be used to determine requirements of the user and desired response, thus enhancing quality of processing the user input. Accordingly, the user input is rephrased with combination of tools (leading to multiple choices of sentences) such as WordNet® dictionary, thesaurus for semantic similarities and Natural Language Generation (NLG), Recurrent Neural Network/Long Short-Term Memory (RNN/LSTM) for generating meaningful sentences.

In an embodiment, the frame generation module 213 may parse the user input and each of the one or more equivalents and generates one or more frames for the user input and the one or more equivalents. Each frame of the one or more frames comprises of multiple slots with headers. The generic templates of slot headers are stored in the other data 210. Each of the one or more frames comprises of one or more slots. The one or more slots are associated with corresponding slot headers generated for accommodating the user input. If the user input cannot be stored in one of the generic templates, then a new template may be dynamically generated with additional slots and updated in the frames data 208. Before storing the user input and the one or more equivalents in each of the corresponding one or more frames, filler words from the user input and the one or more equivalents are discarded. The filler words may be words, alphabets, numbers, symbols or any character. In an embodiment, the filler words may be conjunctions and preposition used in the user input and the one or more equivalents. The filler words may be one of is, are, at, over, under, in or any other possible filler words. The one or more slots in each of the one or more frames are filled with the user input based on a weighted combination of historical data 206, web, and social media. Each of the one or more frames generated using the historical data 206 are assigned a higher weightage compared to each of the one or more frames generated dynamically. For instance, each of the one or more frames generated with the help of historical data 206 is assigned a weight of 0.6 and each of the one or more frames generated dynamically is weighed as 0.4. The weights may change adaptively based on one of similarity of current user input and previous user input, feedback from the one or more users for a given response and number of rephrases of the user input after receiving the response. If the similarity of current user input and previous user input is more, weightage of historical data 206 and hence weightage of each of the one or more frames generated may increase asymptotically towards 1. If the feedback from the one or more users for a given response is positive, weightage of each of the one or more frames generated may increase towards 1 asymptotically. Similarly, if the feedback is negative, weightage of the frames generated may decrease. (for example, the weightage may decrease from 0.7 to 0.3). If the number of rephrases of the user input after receiving the response is more, with every rephrase, weightage of each of the one or more frames generated is decreased towards 0.

In an embodiment, the keyword generation module 214, may generate one or more keywords for each of the one or more frames. The one or more keywords are used to determine user requirements and desired response.

In an embodiment, the domain selector module 215, may classify each of the one or more frames into one or more one or more domains present in the knowledge graph 104 based on the priority data 205 and the historical data 206. The domain selector module 215 may collect the one or more keywords from the keyword generation module 214, for each of the corresponding one or more frames and searches for the one or more keywords in each domain of the one or more domains. The domain selector module 215, may classify the user query into one domain of the one or more domains present in the knowledge graph 104. The classification helps to identify the objective of the query and to ensure that the most appropriate domain of the one or more domains present in the knowledge graph 104 is traversed for providing response to the user input.

In an embodiment, the object determination module 216 may determine one or more objects associated with the at least one domain to provide response to the user input, based on the one or more keywords generated. Further, the object determination module 216 may also determine one or more object links between each of the one or more objects and the one or more keywords. The one or more object links indicate the relevancy and linkage between the one or more objects determined and the one or more keywords. Further, the one or more object links may be used to determine if the one or more objects provide a response relevant to the user input. Further, the object determination module 216 may also determines one or more object links between each of the one or more objects and the one or more keywords. Each of the one or more object links is associated with a corresponding object link confidence value. The object link confidence value may indicate the relevancy between the one or more objects and the one or more keywords. Further, the object determination module 216 may identify at least one optimum object link from the one or more object links, and corresponding one or more objects, based on the corresponding object link confidence value.

In an embodiment, the service determination module 217, may determine at least one service for the corresponding one or more objects identified, based on a metadata of the corresponding one or more objects. For an instance, consider an object determined as camera, and examples of services for the object camera may be the services associated with the camera, like URL of the images being uploaded from different cameras or may be URL of a website providing information about the attributes of camera. Further, the service determination module 217 may determine one or more service links between the at least one service and the corresponding one or more objects. Each of the one or more service link is associated with a second link confidence value. The second link confidence value may indicate relevancy between the one or more objects and the one or more services. Further, the service determination module 217 may identify at least one optimum service link from the one or more service links based on the second link confidence value. The at least one optimum service link indicates corresponding optimum service associated with the identified one or more objects.

In an embodiment, the response generation module 218, may provide a response to the user input. For the user input and each of the one or more equivalents, an action graph may be present. The action graph comprises the corresponding one or more keywords linked to the corresponding one or more objects via an optimum object link. Further, the optimum object is linked to the optimum service identified for the one or more objects. The response generation module 218 may identify an optimum action graph among the action graph generated for the user query and each the one or more equivalents. Once the optimum action graph is determined, the corresponding optimum action graph is processed by the response generation module 217, for providing response to the user input. The response generation module 218 processes the optimum action graph by executing the optimum service associated with the corresponding optimum action graph, thereby providing response to the user input.

In an embodiment, the other modules 219 may include, but are not limited to, a desired response generator module, a display module, and a feedback module. The desired response generator module is used to determine a desired response of the user input. In order to determine the desired response, conversation context and sentence structure of the user input may be considered.

In an embodiment, the display module may be used to display the response provided to the user query. The display module may be one of, but not limited to a monitor, a Liquid Crystal Display (LCD), a Light Emitting Diode (LED) display and/or any other module present which is capable of displaying an output.

In an embodiment, the feedback module may receive feedback from each of the one or more users when an inappropriate response is generated. In an embodiment, the one or more users may reword the corresponding user input when an inappropriate response is generated. The rewording of the corresponding user input may be considered as the feedback.

Figure 3:
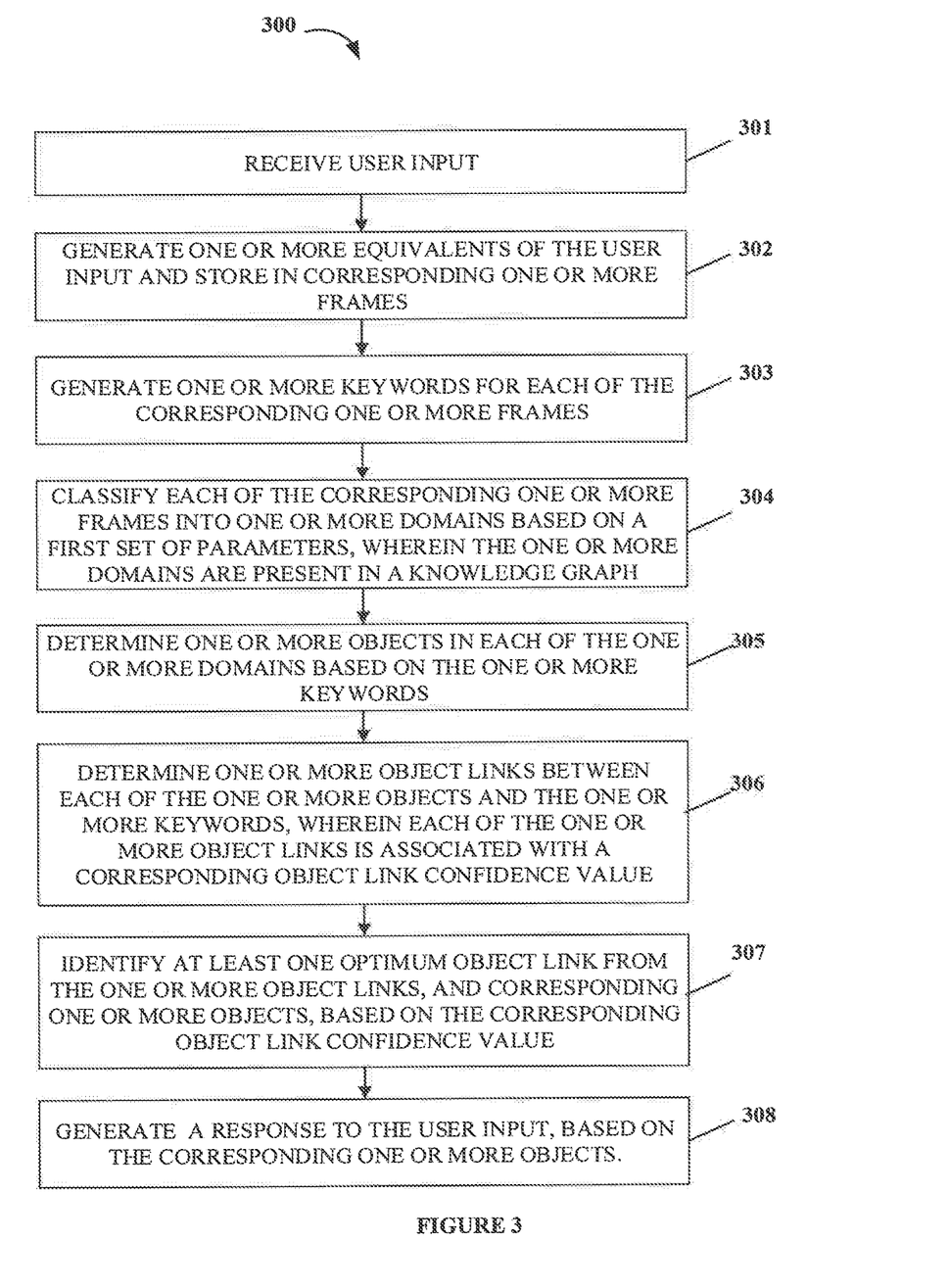
FIG. 3 shows an exemplary flow chart illustrating method steps for providing a response to user input, in accordance with some embodiments of the present disclosure.

FIG. 3 shows an exemplary flow chart illustrating method steps of a method 300 for providing a response to a user input in accordance with some embodiments of the present disclosure;

As illustrated in FIG. 3, the method comprises one or more blocks for determining a response to user input. The method 300 may be described in the general context of computer executable instructions. Generally, computer executable instructions may include routines, programs, objects, components, data structures, procedures, modules, and functions, which perform particular functions or implement particular abstract data types.

The order in which the method 300 is described is not intended to be construed as a limitation, and any number of the described method blocks may be combined in any order to implement the method. Additionally, individual blocks may be deleted from the methods without departing from the scope of the subject matter described herein. Furthermore, the method may be implemented in any suitable hardware, software, firmware, or combination thereof.

At step 301, the user input may be received by the user interface 101. The user interface 101 may be capable of receiving the user input. The user input may be, but not limited to, a user query, generic statements, conversations of the user with the system or other humans, and the like. The user input may be received from the one or more users. In an embodiment, the one or more users may be a person or a computing system.

At step 302, one or more equivalents of the user input, may be generated by the equivalent determination module 212. For instance, consider the user input to be "How many people are standing in front of Taj Mahal now?". The above-mentioned instance may be referred as first instance hereafter in the present disclosure. One of the equivalents, referred as first equivalent, may be "number of people standing in front of Taj Mahal now". A second equivalent may be "people count in front of Taj Mahal". Further, the user input and each of the one or more equivalents are stored in corresponding one or more frames by the frame generation module 213. For the first instance, consider a first frame having five slots, slot 1, slot 2, slot 3, slot 4 and slot 5. Slot 1 header is response, Slot 2 header is object, Slot 3 header is action, Slot 4 header is location, slot 5 header is time. Consider the first equivalent "number of people standing in front of Taj Mahal now". Upon removing the filler words and irrelevant characters, numbers, special symbols and the like, the first equivalent of the user query is stored in the first frame. For the first equivalent "Number" is stored in slot 1, "people" is stored in slot 2, "standing" is stored in slot 3, "Taj Mahal" is stored in slot 4, "now" (the specified time) is stored in slot 5. Similarly, the second equivalent "people count in front of Taj Mahal" is stored in parts in the first frame by the frame generation module 210. For the second equivalent "count" is stored in slot 1, "people" is stored in slot 2, slot 3 is null, "Taj Mahal" is stored in slot 4, slot 5 is null. Table 1 provided below represents, the first frame generated for the first equivalent and Table 2 provided below represents, the second frame generated for the second equivalent respectively.

TABLE 1

| Response | Object | Action | Location | Time |
|---|---|---|---|---|
| number | people | Standing | Front of Taj Mahal | now |

TABLE 2

| Response | Object | Action | Location | Time |
|---|---|---|---|---|
| count | people | | Front of Taj Mahal | |

At step 303, one or more keywords are generated by the keyword generation module 214, for each of the one or more frames generated in step 303. Consider the first instance, from the second frame generated for the second equivalent, at step 302, a first keyword may be "people count" and a second keyword may be "Taj Mahal".

At step 304, each of the corresponding one or more frames are classified into one or more domains by the domain selector module 215, based on a first set of parameters. The one or more domains are present in the knowledge graph 104. The first set of parameters may include, but are not limited to, the priority data 205 and the historical data 206. For the first keyword in the second equivalent "people count" the domains may be tourism, domain comprising devices, statistical data, sociology etc. Similarly, for the second keyword "Taj Mahal" the domains may be tourism, navigation etc. For an instance, for the keyword "Taj Mahal" tourism domain may have the highest priority followed by navigation.

At block 305, one or more objects are determined in each of the one or more domains, by the object determination module 216 based on the one or more keywords. Consider the first instance, for the first keyword "people count" the tourism domain may be traversed to obtain one or more objects. For instance, "people count" is associated with a camera. For another instance "people count" may also be associated with a different place, for example if a previous response was provided as "the people count who visited Paris is 1 million". Here, the word Paris may be associated with people count in the previous response. Hence, for a second equivalent, a domain named locations may be selected considering the keyword people count. Thus, the object determination module 213 recognizes two objects for the keyword "people count", a first object camera and a second object Paris.

At step 306, one or more object links are determined by the object determination module 213, between each of the one or more objects and the one or more keywords. The one or more object links may indicate the association of the one or more objects with the corresponding one or more keywords. Each of the one or more object links is associated with a corresponding object link confidence value.

Figure 4:
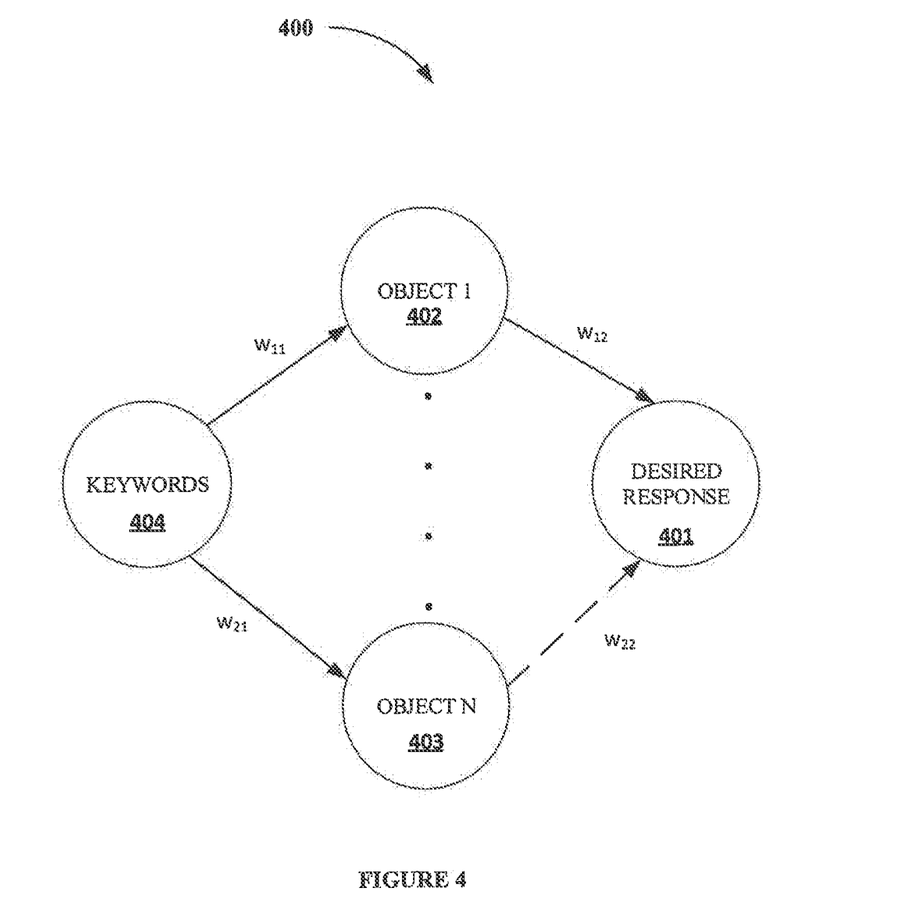
FIG. 4 shows a block diagram illustrating objects and object links for providing a response to user input, in accordance with some embodiments of the present disclosure.

Referring now to FIG. 4, the block diagram 400 is illustrative of determining objects links for providing response to a user input in accordance with some embodiments of the present disclosure.

Illustrated FIG. 4 comprises desired response 401, an object 1 402, . . . , an object N 403 and keywords 404. The keywords 404 may represent the one or more keywords, in this illustration. The desired response comprises at least one keyword of the one or more keywords and represents the desired response of the user input. The desired response is determined by the desired response generator module and indicates the desired response of the user input. The object 1 402, . . . , the object N 403 are the one or more objects determined by the object determination module 213 at step 306, based on the one or more keywords. Further, an object link is established between the desired response 401 and the object 1 402 bearing an object link confidence value $W_{11}$. Similarly, another object link is established between the object 1 402 and the keywords 404 bearing an object link confidence value $W_{12}$. Likewise, an object link is established between the desired response 401 and the object N 403, bearing an object link confidence value $W_{21}$ and another object link is established between the object N 403 and the keywords 404 bearing an object link confidence value $W_{22}$.

In an embodiment, consider the first instance. The first object and the second object found for the first keyword "people count" are camera and Paris respectively. The second keyword "Taj Mahal" may be linked with the first object and the second object to establish a continual path. The second keyword "Taj Mahal" may be linked with the first object camera (If a camera is present in a surrounding of the Taj Mahal, or any other camera which could provide the people count at Taj Mahal). However, for the current scenario, the object Paris may not be helpful for determining number of people at Taj Mahal. Hence, the object link between the second keyword "Taj Mahal" and the second object Paris may be considered as a broken link (represented by dotted lines in FIG. 4). Consider the first instance explained in accordance with FIG. 4. The desired response 401 may be "people count". The keywords 401 may be "Taj Mahal". The object 1 402 may be the camera. The object N may be Paris. As there is no association between Taj Mahal and Paris, a broken object link is established between the object Paris and keyword Taj Mahal.

In an embodiment, the one or more object links are derived from the corresponding domain of the knowledge graph 104 and the metadata associated with the one or more objects. For the first instance, the keyword "Taj Mahal" is associated with the object camera as indicated by the metadata of Taj Mahal (a lamp post near Taj Mahal may be associated with camera, in which case the lamp post becomes a separate object linked to camera through Taj Mahal). The corresponding domains of the knowledge graph 104 are associated with the object link confidence value. The object link confidence value is a numerical value associated with every object link. The object link confidence value may be based on one of rank, confidence, number of search results and search time. Rank may define a degree of matching or closeness between the one or more objects and the one or more keywords. Confidence may indicate a probability or confidence of correctness, of the one or more objects found for the one or more keywords. Number of search results may indicate the number of search results containing the similar keywords or similar equivalents. Search time may be defined as the time required to traverse the database 105, to obtain the results once the one or more keywords are determined. The object link confidence value indicates a probability of using an object for achieving the desired response. In one instance, the object link confidence value may vary from 0 to 1. The object link confidence value of a broken object link may be treated as 0. A path may be defined as traversal from keywords 404 to desired response 401 via an object. An overall object link strength for a path is the product of object link confidence value of every object link in the corresponding path and is computed for each path of traversal.

Considering the first instance explained in accordance with FIG. 4, two paths may be established. First path comprises people count, camera, and Taj Mahal. Second path comprises people count, Agra, and Taj Mahal. The people count may be linked to the camera, and the camera in turn may be linked to the Taj Mahal. The overall object link strength for the first path may be $W_{11}*W_{12}$. Similarly, the overall object link strength for the second path may be $W_{21}*W_{22}$. For the given instance the overall object link strength for the second path may be 0 (as it comprises a broken object link).

Referring back to FIG. 3, at step 307, at least one optimum object link and corresponding one or more objects are identified from the one or more object links, based on the corresponding object link confidence value. The optimum object link is the path with maximum overall object link strength. Considering the first instance explained in accordance with FIG. 4, the first path may be the optimum object link as it has a greater overall object link strength when compared to the overall object link strength of the second path. Thus, the one or more objects associated with the optimum object link are determined. The one or more object associated with the optimum object link may be referred to as at least one optimum object hereafter in the present disclosure.

At step 308, a response to the user input is generated, based on the at least one optimum object determined in step 307. Further steps are explained accordingly.

Figure 5:
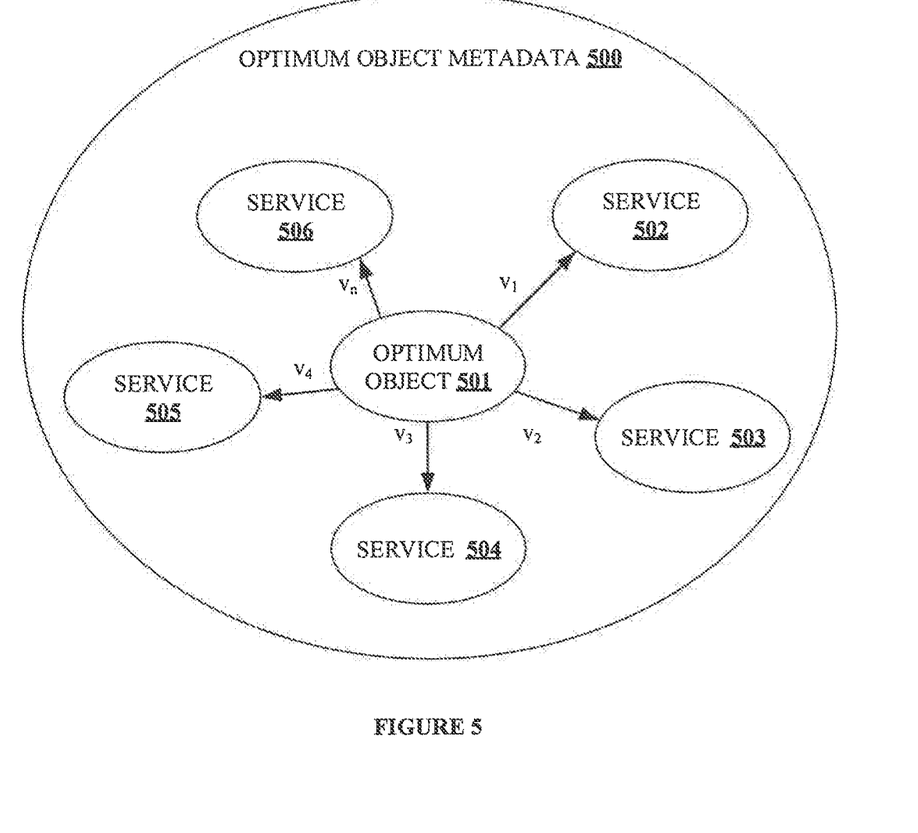
FIG. 5 shows a block diagram of an optimum object metadata for determining an optimum service, for providing a response to user input in accordance with some embodiments of the present disclosure.

FIG. 5 shows a block diagram for determining an optimum service for the determined at least one optimum object for providing response to a user input in accordance with some embodiments of the present disclosure.

Illustrated, Figure 5 comprises, an optimum object metadata 500. The optimum object metadata 500 comprises an optimum object 501, a service 502, a service 503, ... , a service 506. The service 502, the service 503, the service 504, the service 505 and the service 506 are linked to the optimum object 501 via respective service links bearing a service link confidence value $V_1$, $V_2$, $V_3$, $V_4$, $V_5$ and $V_n$ respectively. The service 502, service 503, ... , service 506 may be referred to as one or more services hereafter in the present disclosure.

In an embodiment, at least one service from the one or more services is determined for the at least one optimum object 501, based on the optimum object metadata as illustrated in FIG. 5. Further, one or more service links are determined between the at least one service and the one or more objects, where each of the one or more service link is associated with a corresponding service link confidence value. Further, at least one optimum service link is identified from the one or more service links based on service link confidence value. The at least one optimum service link indicates that corresponding optimum service associated with the determined at least one optimum object may be used for determining an appropriate response.

In an embodiment, for the user input and each of the one or more equivalents an action graph may be present. The action graph comprises the corresponding one or more keywords, linked to the corresponding one or more objects via an optimum object link. Further, the optimum object is linked to the optimum service identified for the one or more objects. An optimum action graph is identified by the response generation module 218, among the action graph generated for the user query and each the one or more equivalents. Once the optimum action graph is determined the corresponding optimum action graph is processed by the response generation module 217, for providing response to the user input. The response generation module 218 processes the optimum action graph by executing the optimum service associated with the corresponding optimum action graph, thereby providing response to the user input.

In accordance to the first instance, for the second equivalent, the at least one optimum object identified may be camera, the services associated with the camera may be retrieved form the metadata of the camera. For example, the various services associated with the camera, pertaining to the second keyword "Taj Mahal" may be a URL of the image being uploaded from cameras in front of Taj Mahal. The URL of the image may be captured by a drone in front of Taj Mahal or the URL of the image may be captured from a lamp post in front of Taj Mahal. Once the camera data (live images are received) the response generation module 218, finds a processing means which may provide the people count (desired response) from the camera data. Further, response generation module 218 may identify an application which may provide the people count, by taking the camera data as an input. The response generation module 218 further processes the URL. For instance, after receiving the live image, the image may be directed to a face count or a head count application which may provide the count of people.

Figure 6:
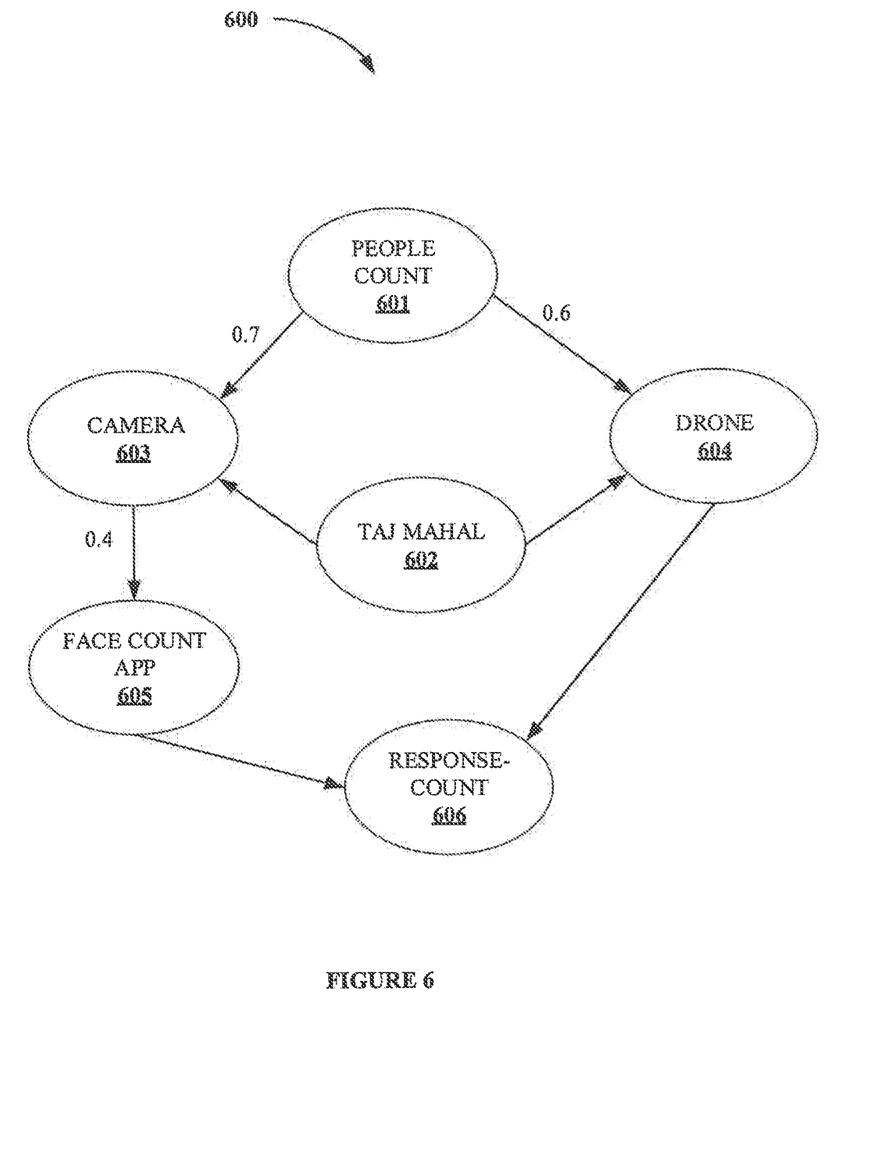
FIG. 6 shows an exemplary block diagram of an action graph used for providing a response to user input in accordance with some embodiments of the present disclosure.

FIG. 6 shows a block diagram of an action graph 600 used for providing response to user input in accordance with some embodiments of the present disclosure. FIG. 6 is in accordance with the first instance.

Illustrated FIG. 6, comprises the first keyword "people count" 601, the second keyword "Taj Mahal" 602, the first object "camera" 603, a drone 604, a face count application 605, and a response count 606. Two paths may be clearly seen in FIG. 6 for providing response.

First path may be traversed as follows: people count 601 to camera 603 (linked to the Taj Mahal 602) to face count application 605 to response(count) 606. In the first path one or more images captured by the camera 603 are provided to the face count application 605 to obtain the response (count) 606.

Second path may be traversed as follows: people count 601 to drone 604 to response (count) 606. In the second path the drone service 604 is capable of taking images as well as providing the response(count) 606.

The strength of the action graph is computed by determining the product of link strength between one or more elements of the action graph and the contribution of the link is computed for each path. The one or more elements of the action graph may include the one or more keywords, optimum objects and corresponding determined optimum services. A contribution of a link is in general 1/N where N is the number of links in the path. However, the link contribution may increase or decrease based on cost involved in the implementation of each path Further, the partial products are added to get total strength for each path. Furthermore, total strength of the path, with maximum strength is taken as the strength of the action graph. Consider an instance, where a goal is to find the number of cars in an open spaced parking lot. The determined optimum services may be use of the available drone or use of the security camera images. Obtaining response using both of the above-mentioned optimum services are equiprobable. This implies that the link contribution is 0.5 for each of the above-mentioned optimum services. Obtaining the number of cars using the security camera images may be time consuming or more difficult compared to obtaining the number of cars using drone. Thus, the cost involved in the implementation of each path may be derived based on amount of time consumed for providing a response and the level of ease with which each of the optimum services provides a response. The cost involved may also be derived based on user feedback (drone cameras are more accurate than security cameras), infrastructure cost involved in implementing a path corresponding to an optimum service (e.g. drone cost versus camera cost).

In FIG. 6, the strength of the first path is (0.5*0.7+0.5*0.4)=0.55 and strength of the second path is (0.6*0.5+0.5*(1−0.4))=0.6. Thereby, second path is chosen, and the strength of the action graph is 0.6.

Similarly, the action graph is computed for each of the one or more equivalents and the action with maximum strength becomes the relevant action graph. The relevant action graph is processed to provide response to the user input.

Computer System

Figure 7:
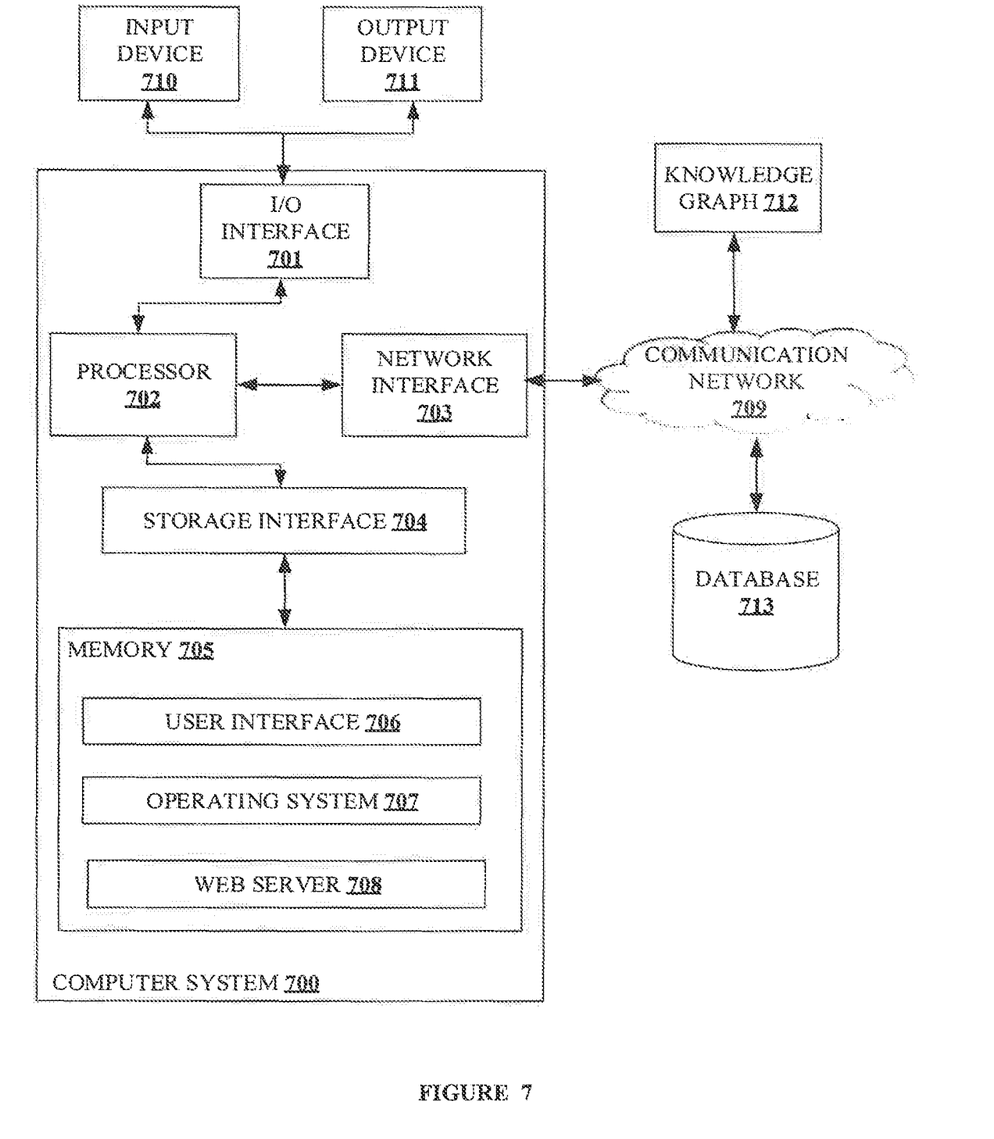
FIG. 7 illustrates a block diagram of an exemplary computer system for implementing embodiments consistent with the present disclosure.

FIG. 7 illustrates a block diagram of an exemplary computer system 700 for implementing embodiments consistent with the present disclosure. In an embodiment, the computer system 700 is used to implement the data processing system 102. The computer system 700 may comprise a central processing unit ("CPU" or "processor") 702. The processor 702 may comprise at least one data processor for executing program components for providing response to the user input. The processor 702 may include specialized processing units such as integrated system (bus) controllers, memory management control units, floating point units, graphics processing units, digital signal processing units, etc.

The processor 702 may be disposed in communication with one or more input/output (I/O) devices (not shown) via I/O interface 701. The I/O interface 701 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 701, the computer system 700 may communicate with one or more I/O devices. For example, the input device 710 may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device 711 may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 700 is connected to the knowledge graph 712 and the database 713 through a communication network 709. The processor 702 may be disposed in communication with the communication network 609 via a network interface 703. The network interface 703 may communicate with the communication network 709. The network interface 703 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 709 may include, without limitation, a direct interconnection, local area network (LAN), wide area network (WAN), wireless network (e.g., using Wireless Application Protocol), the Internet, etc. Using the network interface 603 and the communication network 709, the computer system 700 may communicate with the knowledge graph 712 and the database 713. The network interface 703 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 709 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 702 may be disposed in communication with a memory 705 (e.g., RAM, ROM, etc. not shown in FIG. 7) via a storage interface 704. The storage interface 704 may connect to memory 705 including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 705 may store a collection of program or database components, including, without limitation, user interface 706, an operating system 707, web server 708 etc. In some embodiments, computer system 700 may store user/application data 706, such as, the data, variables, records, etc., as described in this disclosure. Such databases may be implemented as fault-tolerant, relational, scalable, secure databases such as Oracle® or Sybase®.

The operating system 707 may facilitate resource management and operation of the computer system 700. Examples of operating systems include, without limitation, APPLE MACINTOSH® OS X, UNIX®, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLE® IOS™ GOOGLE® ANDROID™, BLACKBERRY® OS, or the like.

In some embodiments, the computer system 700 may implement a web browser 708 stored program component. The web browser 708 may be a hypertext viewing application, for example MICROSOFT® INTERNET EXPLORER™, GOOGLE® CHROME™, MOZILLA® FIREFOX™, APPLE® SAFARI™, etc. Secure web browsing may be provided using Secure Hypertext Transport Protocol (HTTPS), Secure Sockets Layer (SSL), Transport Layer Security (TLS), etc. Web browsers 708 may utilize facilities such as AJAX™, DHTML™, ADOBE® FLASH™, JAVASCRIPT™, JAVA™, Application Programming Interfaces (APIs), etc. In some embodiments, the computer system 700 may implement a mail server stored program component. The mail server may be an Internet mail server such as Microsoft Exchange, or the like. The mail server may utilize facilities such as ASP™, ACTIVEX™, ANSI™ C++/C#, MICROSOFT®, .NET™, CGI SCRIPTS™, JAVA™, JAVASCRIPT™, PERL™, PHP™, PYTHON™, WEBOBJECTS™, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 700 may implement a mail client stored program component. The mail client may be a mail viewing application, such as APPLE® MAIL™, MICROSOFT® ENTOURAGE™, MICROSOFT® OUTLOOK™, MOZILLA® THUNDERBIRD™, etc.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated method of FIG. 3 shows certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

In an embodiment, the system and method as disclosed in the present disclosure, may be used for providing response to the user input adaptively. The system provides response to the user input even when the input is first of its kind and the response is not present in the database. The system collects real-time data and generates the response to the user input.

In an embodiment, the system and method as disclosed in the present disclosure, may provide a user desired response.

In an embodiment, the system and method as disclosed in the present disclosure, may provide an efficient response for the user input as well as details of the path chosen for providing response, even though the user input is generic.

In an embodiment, the system and method as disclosed in the present disclosure, use IoT based solutions present, to provide response to the user input.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference number | Description |
| --- | --- |
| 100 | Environment |
| 101 | User Interface |
| 102 | Data Processing System |
| 103 | Network |
| 104 | Knowledge graph |
| 105 | Database |
| 201 | I/O interface |
| 202 | Memory |
| 203 | Processor |
| 204 | Data |
| 205 | Priority data |
| 206 | Historical data |
| 207 | Other data |
| 208 | Modules |
| 209 | Equivalent determination module |
| 210 | Frame generation module |
| 211 | Keyword generation module |
| 212 | Knowledge graph domain selector module |
| 213 | Object determination module |
| 214 | Service determination module |
| 215 | Response generation module |
| 216 | Other modules |
| 400 | Object link determination block |
| 500 | Optimum service determination block |
| 600 | Action graph |
| 700 | Computer System |
| 701 | I/O Interface |
| 702 | Processor |
| 703 | Network Interface |
| 704 | Storage Interface |
| 705 | Memory |
| 706 | User Interface |
| 707 | Operating System |
| 708 | Web Server |
| 709 | Communication Network |
| 710a, . . . , 710n | Input Devices |
| 711a, . . . , 711n | Output device |
| 712 | Knowledge Graph |
| 713 | Database |

We claim:

1. A method for providing response to user input, said method comprising:

receiving, by a data processing system, user input;

generating, by the data processing system, one or more equivalents of the user input, wherein generating the one or more equivalents comprises determining one or more meaningful sentences associated with the user input, and wherein the user input and each of the one or more equivalents of the user input are stored in corresponding one or more frames and weights are assigned asymptotically to the one or more frames based on similarity between the current user input and a previous user input;

generating, by the data processing system, one or more keywords from the one or more equivalents for each of the corresponding one or more frames, wherein the one or more keywords comprises primary keywords and alternate keywords;

classifying, by the data processing system, each of the corresponding one or more frames into one or more domains based on a first set of parameters, wherein the one or more domains are present in a knowledge graph;

determining, by the data processing system, one or more objects in each of the one or more domains based on the one or more keywords;

determining, by the data processing system, one or more object links between each of the one or more objects and the one or more keywords, wherein each of the one or more object links is associated with a corresponding object link confidence value;

identifying, by the data processing system, at least one optimum object link from the one or more object links, and corresponding one or more objects, based on the corresponding object link confidence value; and generating, by the data processing system, a response to the user input, based on the corresponding one or more objects.

2. The method as claimed in claim 1, wherein, the response to the user input is based on metadata of the corresponding one or more objects.

3. The method as claimed in claim 2, wherein, generating the response comprises:

determining, by the data processing system, at least one service for the corresponding one or more objects, based on metadata of the corresponding one or more objects;

determining, by the data processing system, one or more service links between the at least one service and the one or more objects, wherein each of the one or more service links is associated with a corresponding service link confidence value;

identifying, by the data processing system, at least one optimum service link from the one or more service links based on the corresponding service link confidence value, wherein the at least one optimum service link indicates corresponding optimum service associated with the identified one or more objects; and processing, by the data processing system, the identified optimum service to provide the response to the user input.

4. The method as claimed in claim 3, wherein the service link confidence value is based on relevancy between the one or more objects and the corresponding one or more services.

5. The method as claimed in claim 1, further comprising:

generating the one or more frames based on historical data, wherein each of the one or more frames comprises one or more slots comprising at least a part of one of the user input and the one or more equivalents, based on a header associated with each of the one or more slots; and dynamically updating the one or more frames with new templates.

6. The method as claimed in claim 1, wherein the first set of parameters comprises at least one of historical data, and predefined priorities associated with each of the one or more domains.

7. The method as claimed in claim 1, wherein the object link confidence value is based on one of a rank, a confidence, number of search results, and a search time, and wherein an object link with a low object link confidence value is a broken object link.

8. A data processing system for providing response to user input, said data processing system comprising:
a processor; and
a memory, communicatively coupled with the processor, storing processor executable instructions, which, on execution causes the processor to:

receive a user input;

generate, one or more equivalents of the user input, wherein generating the one or more equivalents comprises determining one or more meaningful sentences associated with the user input, wherein the user input and each of the one or more equivalents of the user input are stored in corresponding one or more frames and weights are assigned asymptotically to the one or more frames based on similarity between the current user input and a previous user input;

generate, one or more keywords from the one or more equivalents for each of the corresponding one or more frames, wherein the one or more keywords comprises primary keywords and alternate keywords;

classify, each of the corresponding one or more frames into one or more domains based on a first set of parameters, wherein the one or more domains are present in a knowledge graph;

determine, one or more objects in each of the one or more domains based on the one or more keywords;

determine, one or more object links between each of the one or more objects and the one or more keywords, wherein each of the one or more object links is associated with a corresponding object link confidence value;

identify, at least one optimum object link from the one or more object links, and corresponding one or more objects, based on the corresponding object link confidence value; and generate, a response to the user input, based on the corresponding one or more objects.

9. The data processing system as claimed in claim 8, wherein, the response to the user input is based on metadata of the corresponding one or more objects.

10. The data processing system as claimed in claim 8, wherein, during generating a response the processor is further configured to:

determine at least one service for the corresponding one or more objects, based on metadata of the corresponding one or more objects;

determine one or more service links between the at least one service and the one or more objects, wherein each of the one or more service link is associated with a corresponding service link confidence value;

identify at least one optimum service link from the one or more service links based on the corresponding service link confidence value, wherein the at least one optimum service link indicates corresponding optimum service associated with the identified one or more objects; and process the identified optimum service to provide the response to the user input.

11. The data processing system as claimed in claim 8, further comprising:

generating the one or more frames based on historical data, wherein each of the one or more frames comprises one or more slots comprising at least a part of one of the user input and the one or more equivalents, based on a header associated with each of the one or more slots; and dynamically updating the one or more frames with new templates.

12. The data processing system as claimed in claim 8, wherein the first set of parameters comprises at least one of historical data, and predefined priorities associated with each of the one or more domains.

13. The data processing system as claimed in claim 8, wherein the object link confidence value is based on one of a rank, a confidence, number of search results, and a search time, and wherein an object link with a low object link confidence value is a broken object link.

14. The data processing system as claimed in claim 8, wherein each of the one or more frames comprises one or more slots comprising at least a part of one of the user input and the one or more equivalents, based on a header associated with each of the one or more slots.

15. A non-transitory computer readable medium including instruction stored thereon that when processed by at least one processor cause a data processing system to perform operation comprising:
   receiving user input;
   generating one or more equivalents of the user input, wherein generating the one or more equivalents comprises determining one or more meaningful sentences associated with the user input, and wherein the user input and each of the one or more equivalents of the user input are stored in corresponding one or more frames and weights are assigned asymptotically to the one or more frames based on similarity between the current user input and a previous user input;
   generating one or more keywords from the one or more equivalents for each of the corresponding one or more frames, wherein the one or more keywords comprises primary keywords and alternate keywords;
   classifying each of the corresponding one or more frames into one or more domains based on a first set of parameters, wherein the one or more domains are present in a knowledge graph;
   determining one or more objects in each of the one or more domains based on the one or more keywords;
   determining one or more object links between each of the one or more objects and the one or more keywords, wherein each of the one or more object links is associated with a corresponding object link confidence value;
   identifying at least one optimum object link from the one or more object links, and corresponding one or more objects, based on the corresponding object link confidence value; and
   generating a response to the user input, based on the corresponding one or more objects.

16. The medium as claimed in claim 15, wherein, the response to the user input is based on metadata of the corresponding one or more objects.

17. The medium as claimed in claim 15, wherein, the instruction causes the processor to generate the response by:
   determining at least one service for the corresponding one or more objects, based on metadata of the corresponding one or more objects;
   determining one or more service links between the at least one service and the one or more objects, wherein each of the one or more service links is associated with a corresponding service link confidence value;
   identifying at least one optimum service link from the one or more service links based on the corresponding service link confidence value, wherein the at least one optimum service link indicates corresponding optimum service associated with the identified one or more objects; and
   processing the identified optimum service to provide the response to the user input.

18. The medium as claimed in claim 17, wherein the service link confidence value is based on relevancy between the one or more objects and the corresponding one or more services.

19. The medium as claimed in claim 15, further comprising:
   generating the one or more frames based on historical data, wherein each of the one or more frames comprises one or more slots comprising at least a part of one of the user input and the one or more equivalents, based on a header associated with each of the one or more slots; and
   dynamically updating the one or more frames with new templates.

20. The medium as claimed in claim 15, wherein the first set of parameters comprises at least one of historical data, and predefined priorities associated with each of the one or more domains.

21. The medium as claimed in claim 15, wherein the object link confidence value is based on one of a rank, a confidence, number of search results, and a search time, and wherein an object link with a low object link confidence value is a broken object link.

\* \* \* \* \*